(12) United States Patent
Keller et al.

(10) Patent No.: US 7,710,108 B2
(45) Date of Patent: May 4, 2010

(54) HALL EFFECT ACCELERATOR MODULE

(75) Inventors: Robert J. Keller, Carpentersville, IL (US); Mario Orrico, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 181 days.

(21) Appl. No.: 12/039,863

(22) Filed: Feb. 29, 2008

(65) Prior Publication Data

US 2009/0165745 A1 Jul. 2, 2009

Related U.S. Application Data

(60) Provisional application No. 60/918,476, filed on Mar. 16, 2007.

(51) Int. Cl.
*G01B 7/30* (2006.01)
(52) U.S. Cl. ............... 324/207.2; 324/207.22; 324/207.25; 123/399
(58) Field of Classification Search ............ 324/207.2, 324/207.22, 207.25; 123/399
See application file for complete search history.

(56) References Cited

U.S. PATENT DOCUMENTS

| 5,712,561 | A | | 1/1998 | McCurley et al. |
| 5,878,359 | A | * | 3/1999 | Takeda ............ 701/34 |
| 6,316,935 | B1 | * | 11/2001 | Vanzuilen ........... 324/207.21 |
| 6,396,259 | B1 | * | 5/2002 | Washeleski et al. .... 324/207.22 |
| 2006/0061353 | A1 | * | 3/2006 | Etherington et al. ..... 324/207.2 |
| 2006/0117902 | A1 | | 6/2006 | Martin et al. |

FOREIGN PATENT DOCUMENTS

| DE | 19825433 | 1/1999 |
| GB | 2403294 | 12/2004 |
| WO | WO 2006058344 A | 6/2006 |

OTHER PUBLICATIONS

International Search Report and Written Opinion for PCT/US2008/055778.

* cited by examiner

*Primary Examiner*—Erick Solis
(74) *Attorney, Agent, or Firm*—Mark W. Croll; Paul F. Donovan (57) ABSTRACT

An accelerator module for an electric vehicle, including a rotor actuator designed to hold a magnet in one end and to provide a drive interface with the vehicle at the other end. The accelerator module employs a Hall Effect chip configured to produce a variable voltage output in proportion to the relative locations of the magnet and the Hall Effect chip, such that when the rotor actuator is caused to rotate, the magnet is rotated across the Hall Effect chip. The Hall Effect chip includes a Hall Effect sensor, which senses differences in magnetic fields. When the magnet is passed across the Hall Effect sensor, the magnetic field will change in proportion to the amount of rotation of the rotor actuator. The variable voltage produced by the Hall Effect chip may then be translated into variable acceleration for the vehicle.

18 Claims, 11 Drawing Sheets

HALL EFFECT ACCELERATOR MODULE

CROSS REFERENCE TO RELATED APPLICATION

This Non-Provisional Application claims benefit to U.S. Provisional Application Ser. No. 60/918,476 on Mar. 16, 2007.

FIELD OF THE INVENTION

The present invention relates generally to accelerator modules and, more particularly, to accelerator modules for electrical powered vehicles.

BACKGROUND OF THE INVENTION

Accelerator modules for electrically powered objects transform physical movement into an electrical signal. For example, a common application for accelerator modules is in electrical powered vehicles, such as golf carts, to control the acceleration and deceleration of the vehicle. Typically, when the accelerator pedal of an electric vehicle is pressed by the operator, the accelerator module is activated and provides an electric signal proportional to the extent that the pedal is depressed. The electric motor then provides acceleration of the vehicle in accordance with the electric signal received from the accelerator module.

Some known accelerator modules employ variable resistance mechanisms that include a wiper element configured to wipingly engage resistance elements to generate an electric signal that corresponds to the change in position of the wiper element. While variable resistance accelerator modules have proven to operate in a satisfactory manner, such accelerator modules exhibit the drawback of requiring contact between the wiping element and the resistance elements. Consequently, the elements may be subject to physical wear over time. A need therefore exists in the art for an accelerator module that is less susceptible to potential wear following extensive usage.

The present invention is directed at overcoming these and other known problems and disadvantages with existing accelerator modules.

SUMMARY OF THE INVENTION

The present invention includes an accelerator module that may be used to provide a variable voltage output for use in an electric vehicle. More specifically, an embodiment of the present invention includes an accelerator module comprising a rotor actuator configured to hold a magnet within a recess at one end and to provide a drive interface at the other end. The apparatus also employs a Hall Effect chip configured to produce a variable voltage output in proportion to the relative locations of the magnet and the Hall Effect chip, such that when the rotor actuator is caused to rotate, the magnet is rotated across the Hall Effect chip in an arc-type path. Because the Hall Effect chip includes a Hall Effect sensor, which senses differences in magnetic fields, when the magnet is passed across the Hall Effect sensor, the magnetic field will change in proportion to the amount of rotation of the rotor actuator and a change in the variable voltage output will be produced. The variable output voltage may then in turn control the acceleration or deceleration of the electric vehicle.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 1:
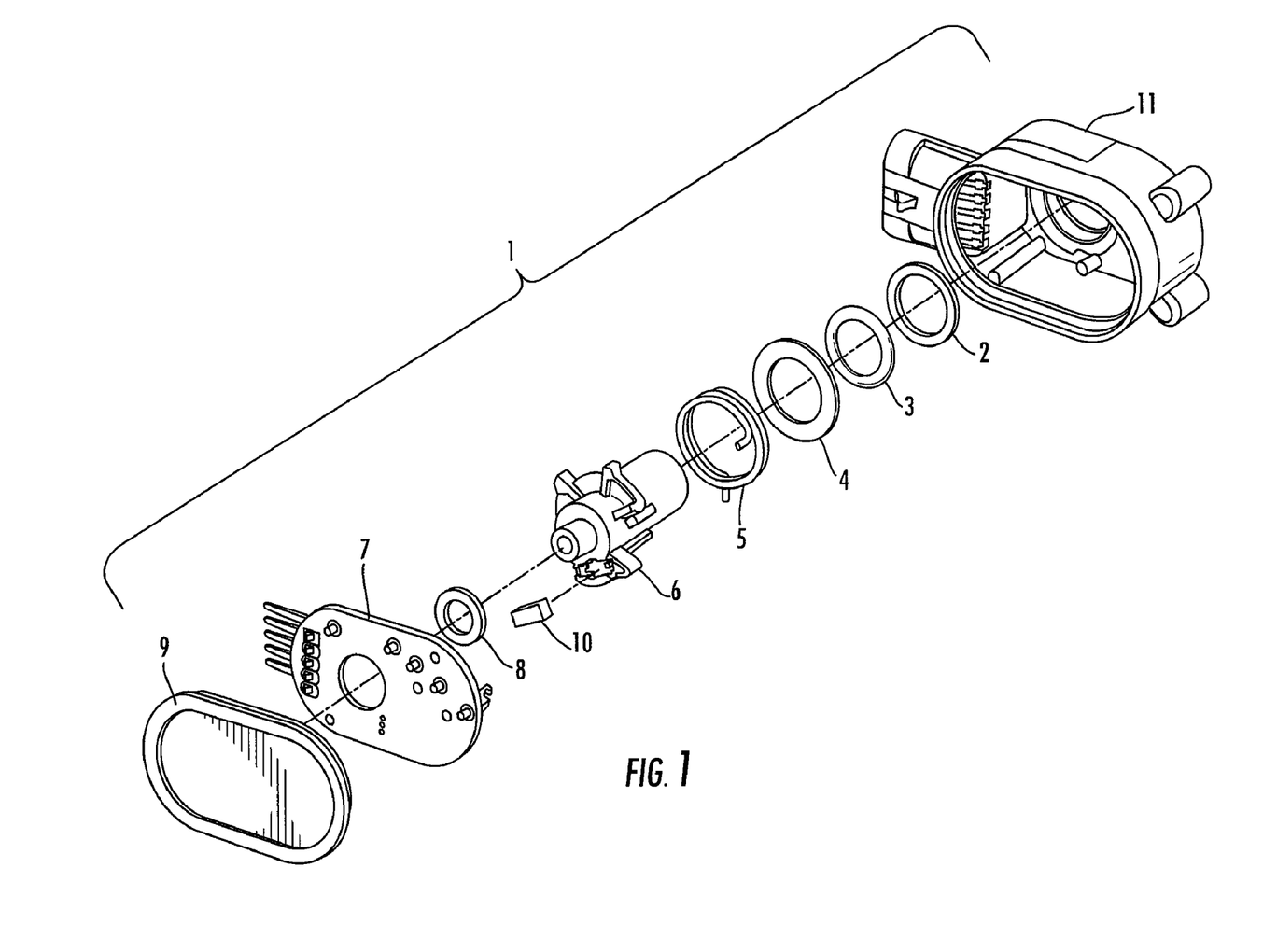
FIG. 1 is an exploded view of an embodiment of an accelerator module.

Exemplary aspects of an accelerator module 1 are depicted in various views in FIGS. 1-12. Referring to FIG. 1, which is an exploded view, and FIGS. 2a, 2b and 2c, which are assembled views, and FIGS. 3a and 3b, which are section views, the accelerator module 1 of embodiments of the invention includes a housing 11 and a cover 9 used to contain, seal and protect the components of the module 1 from outside contamination, including water and dirt, and to shield the components of the module 1 from debris. The housing 11 and the cover 9 are configured to cooperate to provide a watertight enclosure for the accelerator module 1. The housing 11 and cover 9 may be made of any suitable material that provides effective protection for the module components contained within the housing and cover.

As more clearly shown in FIG. 1, the accelerator module 1 may include the following components: a felt washer 2, an o-ring 3, a retaining washer 4, a torsion spring 5, a rotor actuator 6, a magnet 10, a spacer washer 8, and a printed circuit (PC) board assembly 7. The felt washer 2 may be made of other suitable materials used for washers. The PC board assembly 7 further includes an on/off switch 12 and a Hall Effect chip 13, as further illustrated in FIGS. 6 and 10.

Figure 2A:
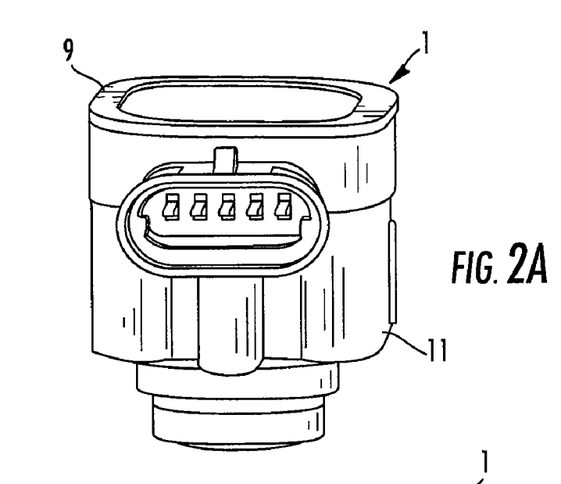
FIGS. 2a, 2b and 2c are isometric views of an assembled accelerator module
Figure 2B:
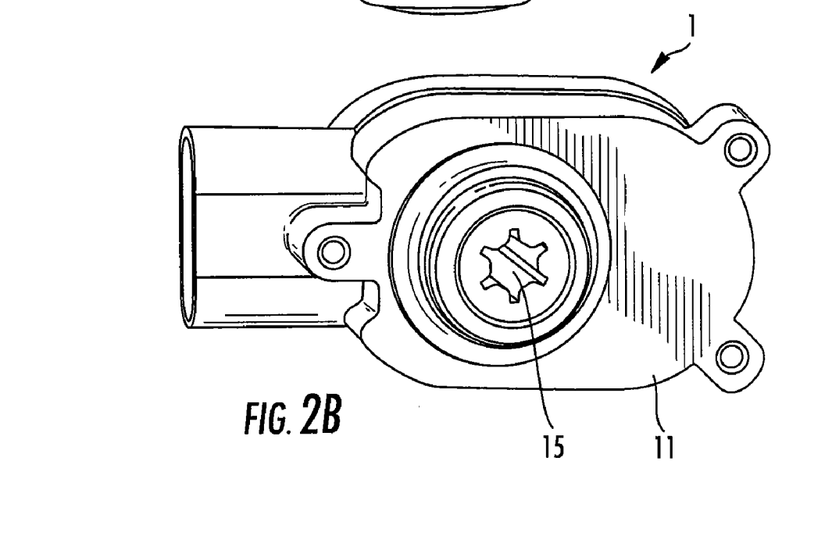
Figure 2C:
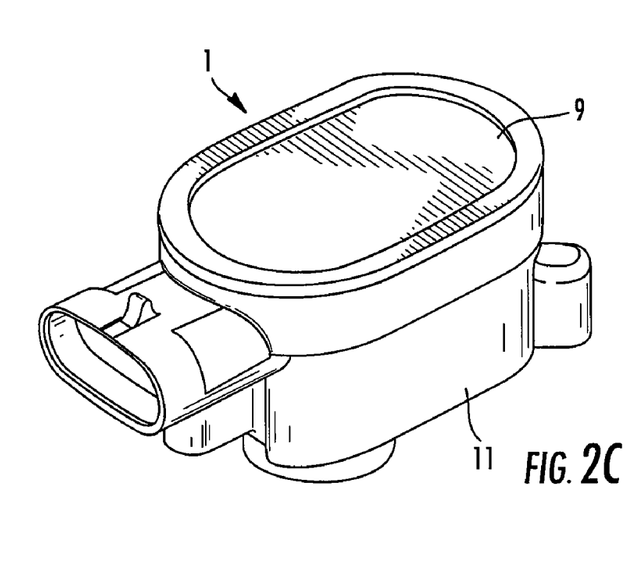
Figure 3A:
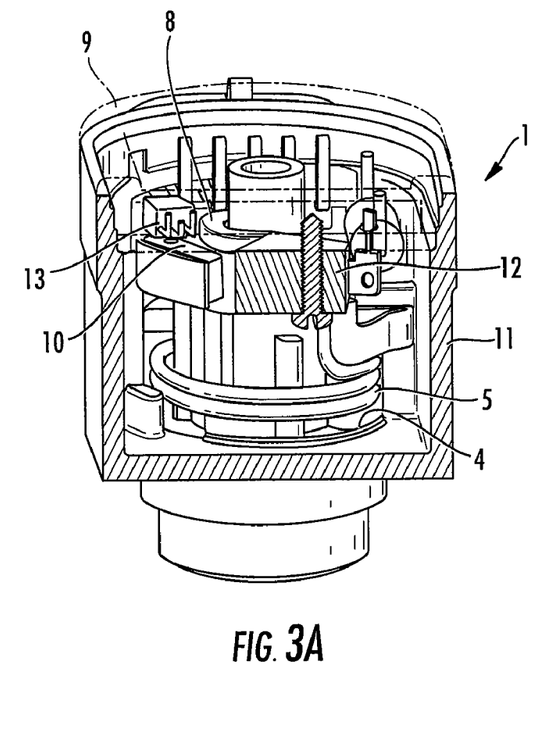
FIGS. 3a and 3b are isometric section views of an assembled accelerator module.
Figure 3B:
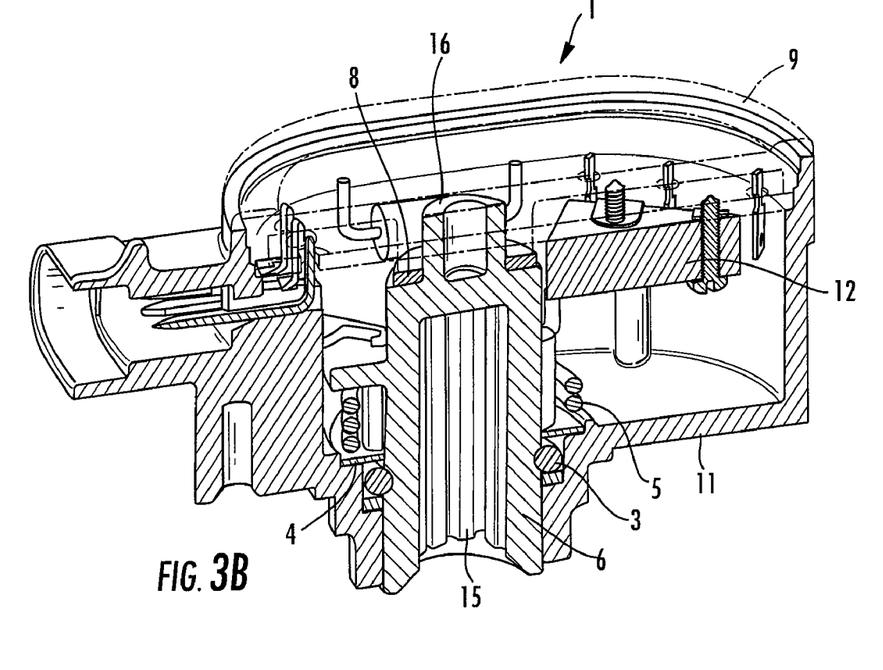

As illustrated in FIGS. 1-3, one end 15 of the rotor actuator 6 may receive the torsion spring 5, the retaining washer 4 stacked on or positioned adjacent to the torsion spring 5, the o-ring 3 stacked on or positioned adjacent to the washer 4, and finally, the felt washer 2 stacked on or positioned adjacent to the o-ring 3, all positioned between the housing 11 and the rotor actuator 6 to provide a resilient seal between the rotor actuator 6 and the housing 11. Alternate configurations of similar elements for providing a resilient seal between the rotor actuator 6 and the housing 11 are also contemplated. With the illustrated configuration, the rotor actuator 6 will be pivotably disposed in the housing 11.

Figure 10:
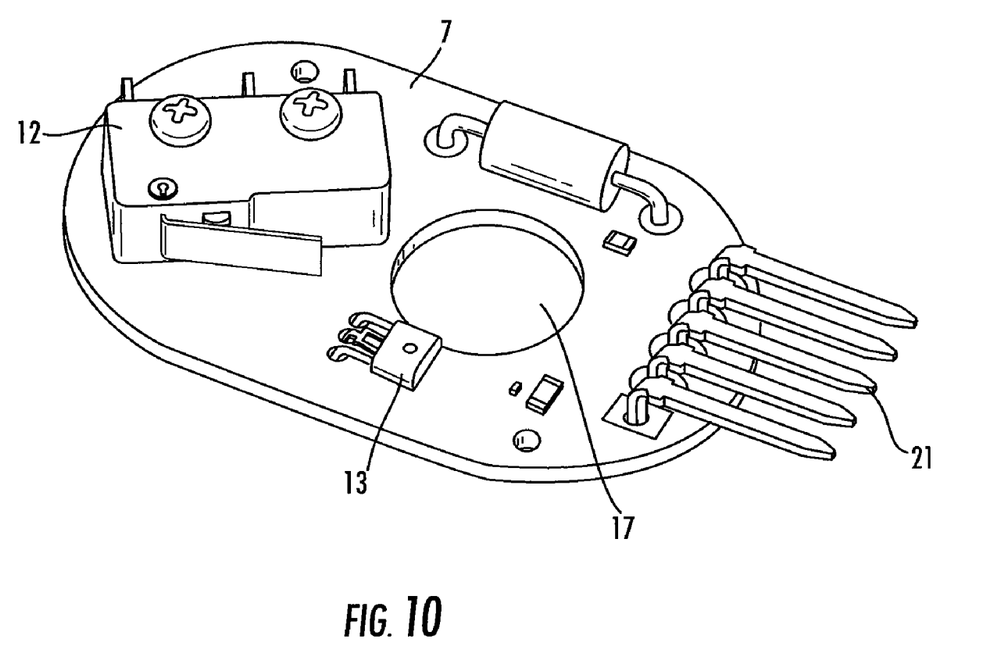
FIG. 10 is an isometric view of an embodiment of a printed circuit board.
Figure 11:
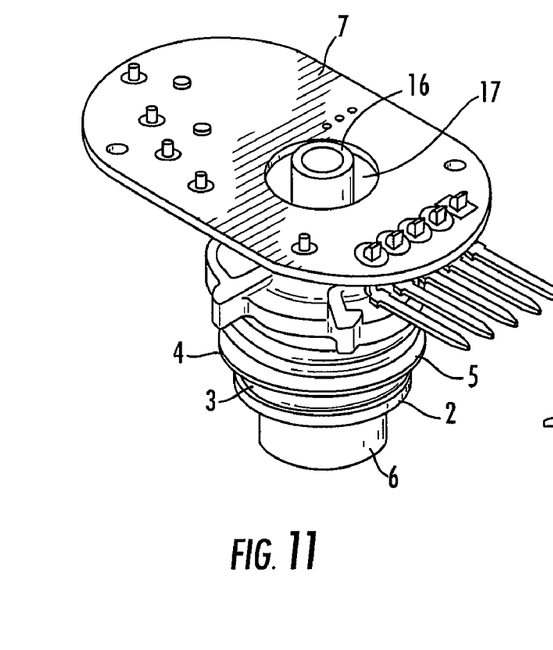
FIG. 11 is an isometric view of an assembled accelerator module, without a housing or cover.
Figure 12:
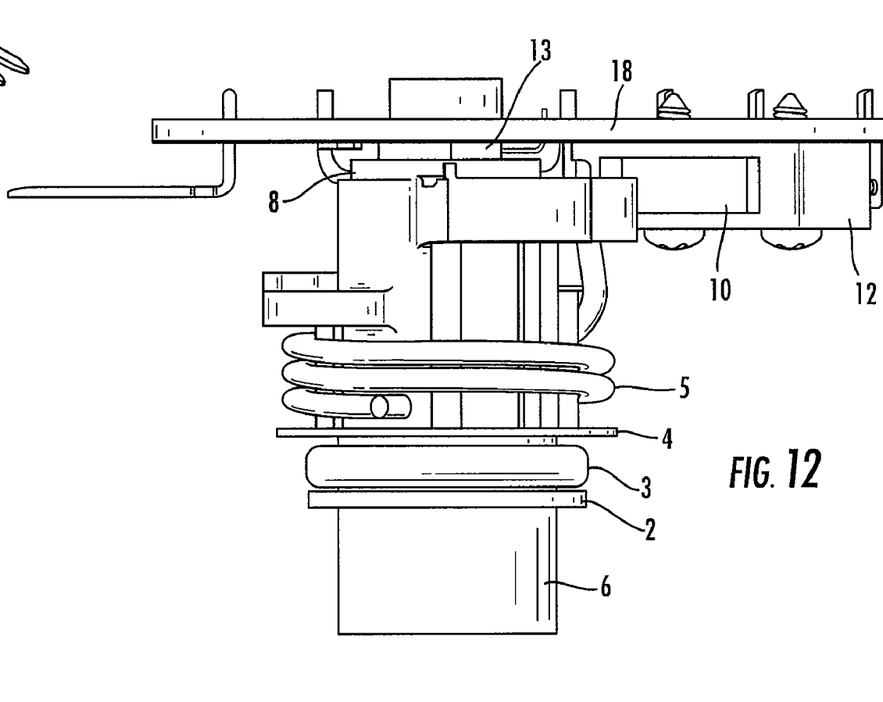
FIG. 12 is a side plan view of an assembled accelerator module, without a housing or cover.

Referring to FIG. 2, the end 15 of the rotor actuator 6 may be configured to extend through an opening in the housing body 11. In one embodiment, the end 15 may define a spline for receiving a shaft or lever that may be linked to a vehicle's accelerator pedal, such as to the accelerator pedal of an electric vehicle. It should be understood that other forms of drive interface are possible and may be employed to connect the accelerator pedal to the accelerator module 1. The opposite end 16 of the rotor actuator 6 is configured to extend through an opening 17 formed in the PC board assembly 7, as shown in FIGS. 10-12.

Figure 9:
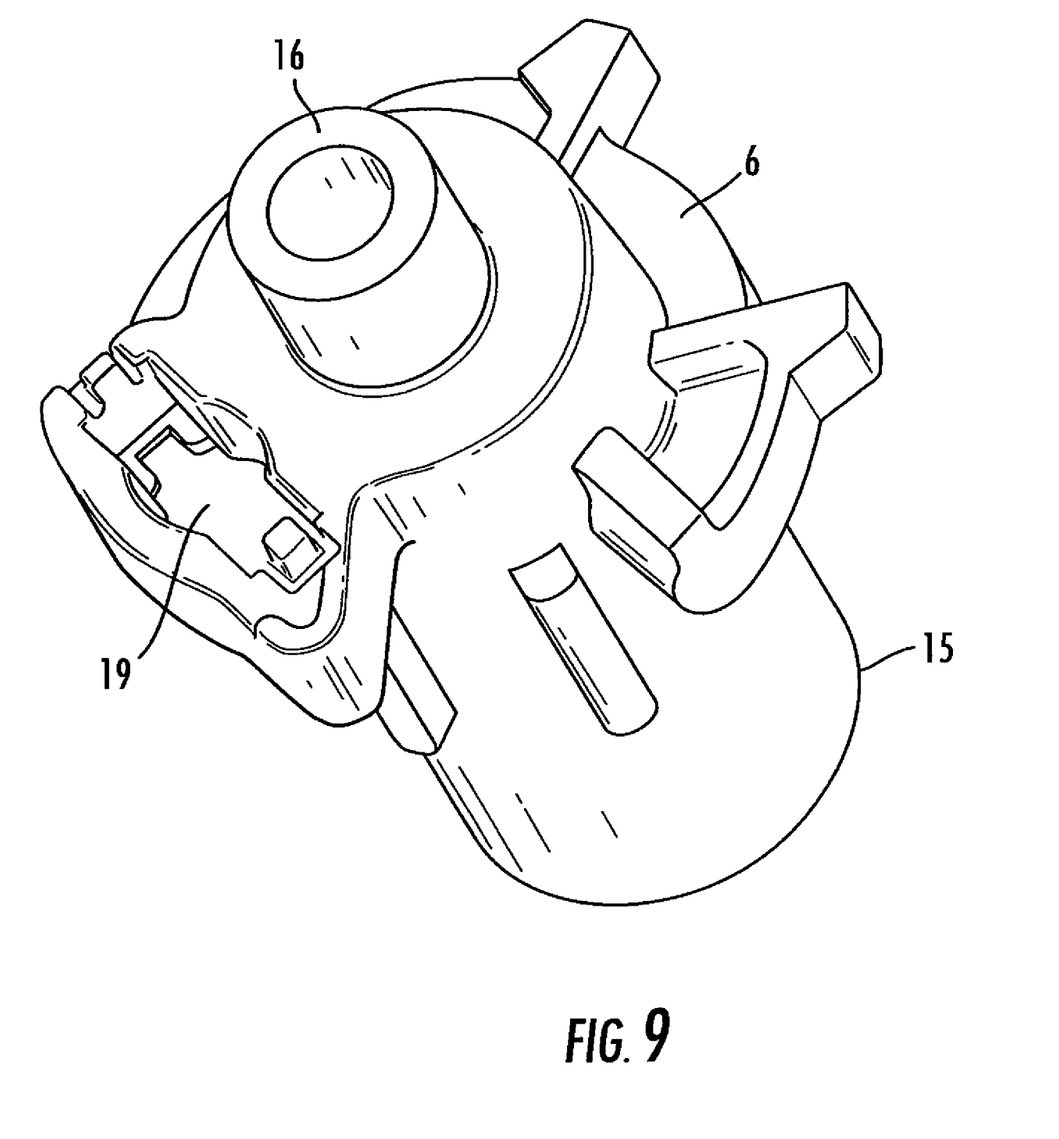
FIG. 9 is an isometric view of an embodiment of a rotor actuator.

Referring to FIG. 9, the rotor actuator 6 is illustrated. The rotor actuator 6 may define a recess 19 located adjacent the end 16. As shown by FIGS. 1 and 3a, the recess 19 may be configured to receive the magnet 10.

In operation, a shaft or lever that is linked or connected to the vehicle's accelerator pedal will engage the module 1 through the splined end 15 of the rotor actuator 6. As the vehicle's accelerator pedal is pressed, this causes rotational movement, such as pivoting, of the shaft or lever received in the splined end 15 of the rotor actuator 6, which in turn causes rotational movement of the rotor actuator 6. As the rotor actuator 6 rotates, the magnet 10 that is mounted in the rotor actuator recess 19 will also rotate. As the magnet 10 passes across the PC-board assembly 7, the magnet 10 will pass, in an arc-type path, across the Hall Effect chip 13 mounted to the PC board assembly 7. As the magnet 10 passes across the Hall Effect chip 13, a Hall Effect sensor within the Hall Effect chip 13 will sense the change in magnetic field. The Hall Effect chip 13 will then produce a variable voltage output in proportion to the relative locations of the magnet 10 and the Hall Effect chip 13. The variable voltage output may be translated into variable acceleration for the vehicle. As the accelerator pedal is released, the rotor actuator 6 will rotate in the opposite direction with the magnet 10, with assistance by the torsion spring 5, sweeping the magnetic field sequence in the opposite direction over the Hall Effect chip 13, and thus changing the voltage output. This will translate into a change in acceleration of the vehicle, namely deceleration of the vehicle. One of skill in the art will appreciate that the operation of the accelerator module 1 described above may be repeated each time the accelerator pedal is pressed or released.

Figure 6:
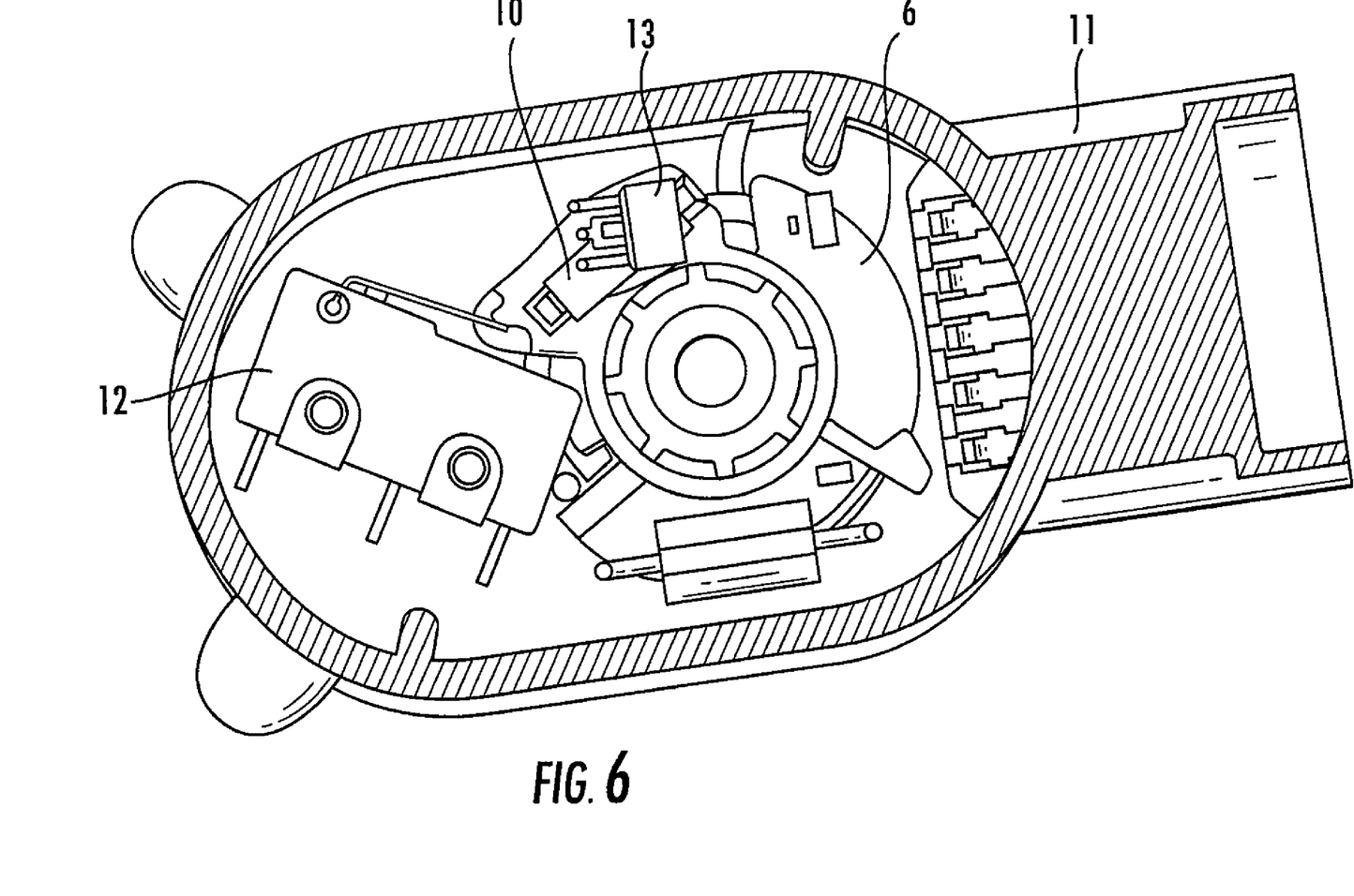
FIG. 6 is an isometric section view of an accelerator module, without a printed circuit board in place.
Figure 7:
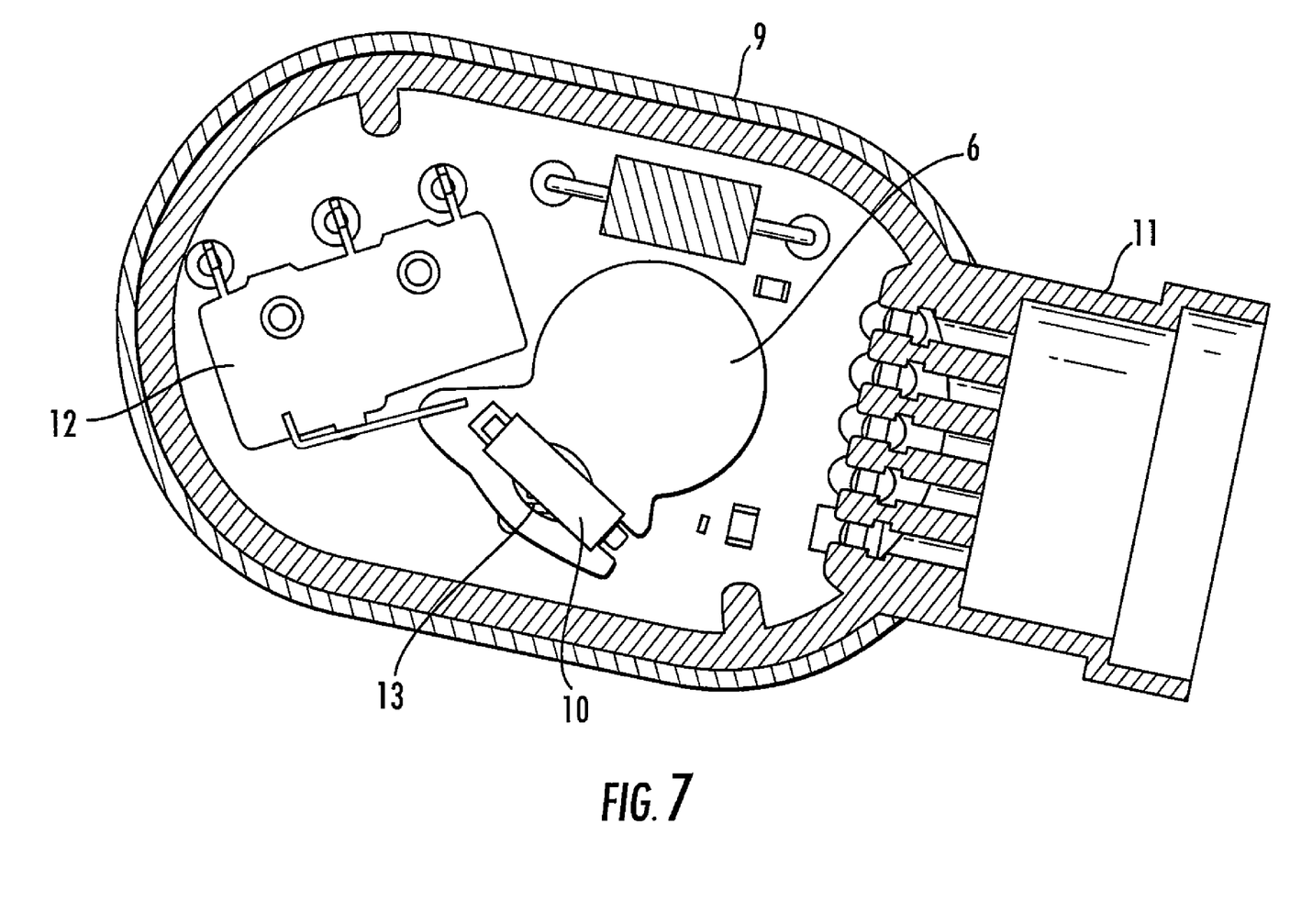
FIG. 7 is a plan section view of an accelerator module, through the magnet.
Figure 8:
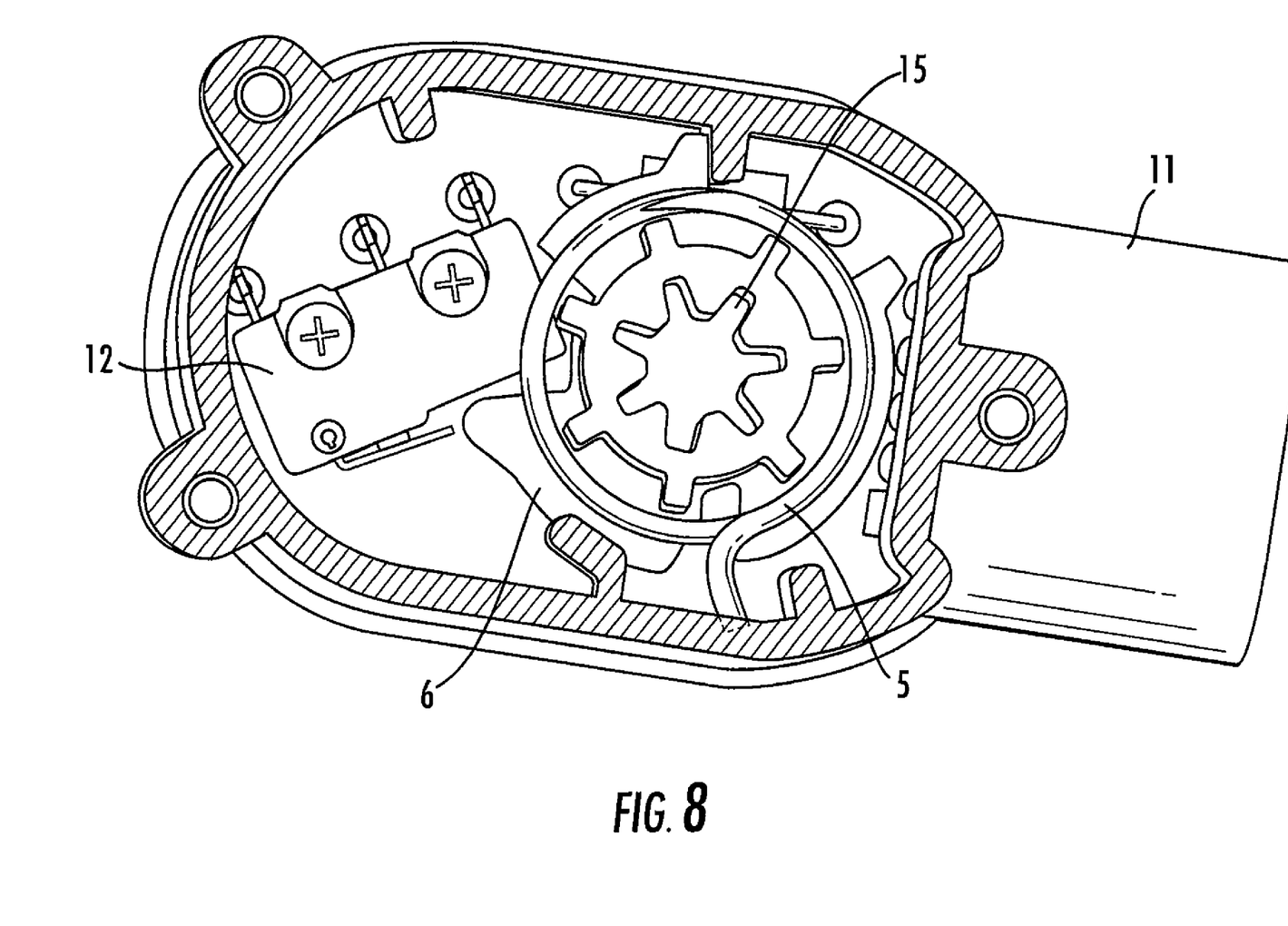
FIG. 8 is an isometric bottom view of an accelerator module, with the rotor actuator in the rest position.

Referring to FIG. 6, the relative positions of the Hall Effect chip 13 and the magnet 10 when the accelerator module 1 is at rest are illustrated. It should be understood that the north and south poles of the magnet 10 will, of course, provide opposite effects when passed across the Hall Effect chip, thus once the electronics have been properly configured, the orientation of the magnet 10 within the recess 19 should be kept consistent to provide the desired variable voltage output.

In a dual functional aspect of the invention, the rotor actuator 6 may also be configured to cooperate with a switch 12 mounted within the module 1 that provides on/off functionality for the vehicle. Referring to FIGS. 5-8, the rotor actuator 6 may be configured to contact and trigger the switch 12, which may be linked precisely with a desired initial system output voltage, during rotation of the rotor actuator 6, to perform the parallel circuit function of turning "on" the module early in the rotational movement of the rotor actuator 6. The switch 12 may be included in the module 1 for safety reasons, for example, so the traction function of the vehicle could not be accidentally enabled with the pedal in the up position, for example. Similarly, when the rotor actuator 6 rotates in the opposite direction, the rotor actuator 6 will again contact the switch 12 and precisely trigger the switch 12 to turn "off" the module 1. With the switch 12 in the "off" position, the module 1 is turned off so as to prevent the vehicle from operating inadvertently.

Referring to FIGS. 3b and 10, the PC board assembly 7 may additionally comprise edge connectors 21, which may extend through an open-ended portion of the housing 11 to allow the accelerator module 1 to be electrically connected to the vehicle. The PC board assembly 7 may also include components that provide additional on-board electronic functions, such as over-voltage protection, transient protection, and/or reverse-voltage protection (not shown).

Referring to FIGS. 1 and 12, a spacer washer 8 having a predetermined thickness may be disposed between the PC board assembly 7 and the rotor actuator 6 to space apart the PC board assembly 7 and the rotor actuator 6.

Figure 4:
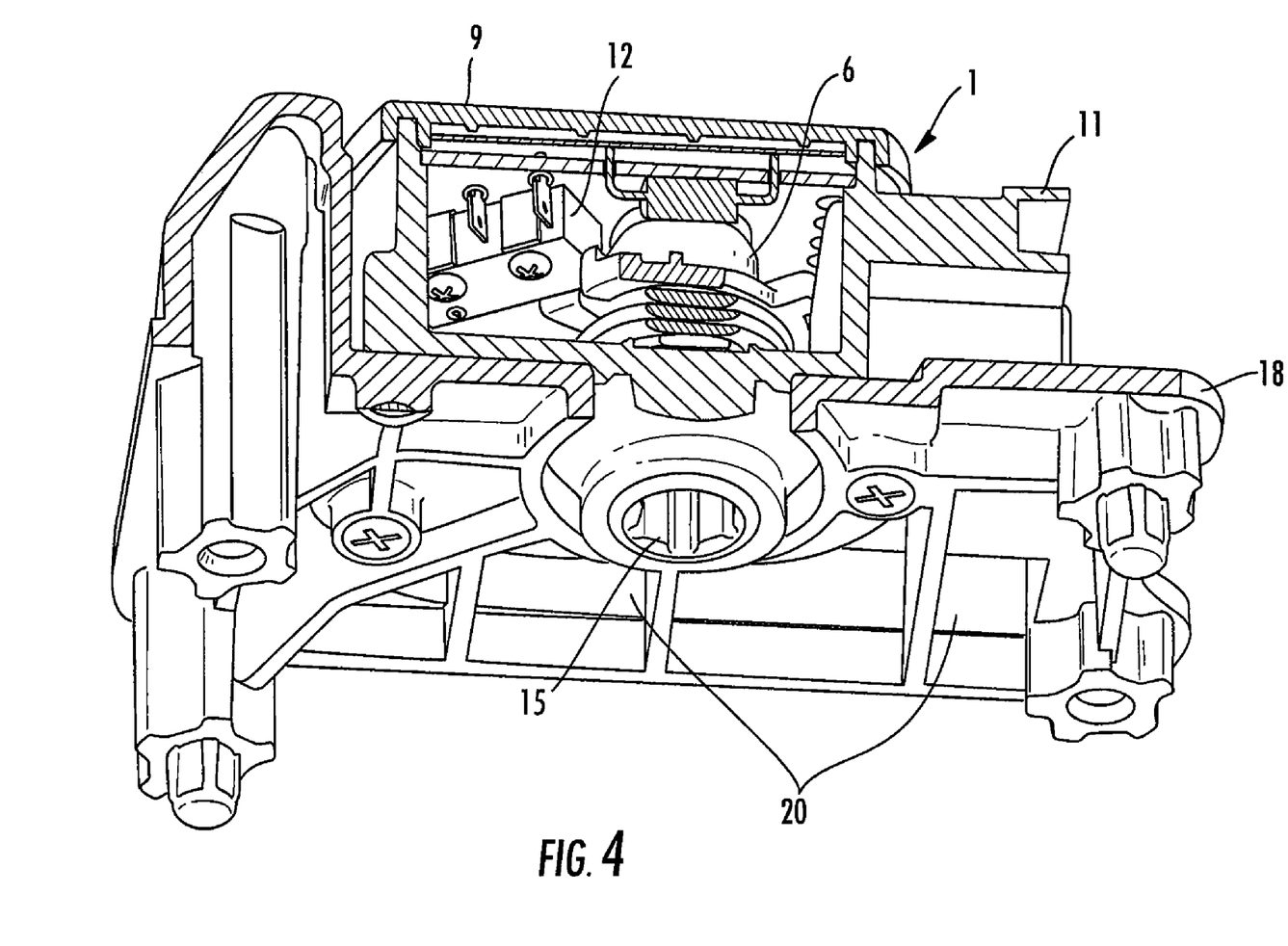
FIG. 4 is an isometric section view of an accelerator module attached to a mounting bracket.
Figure 5:
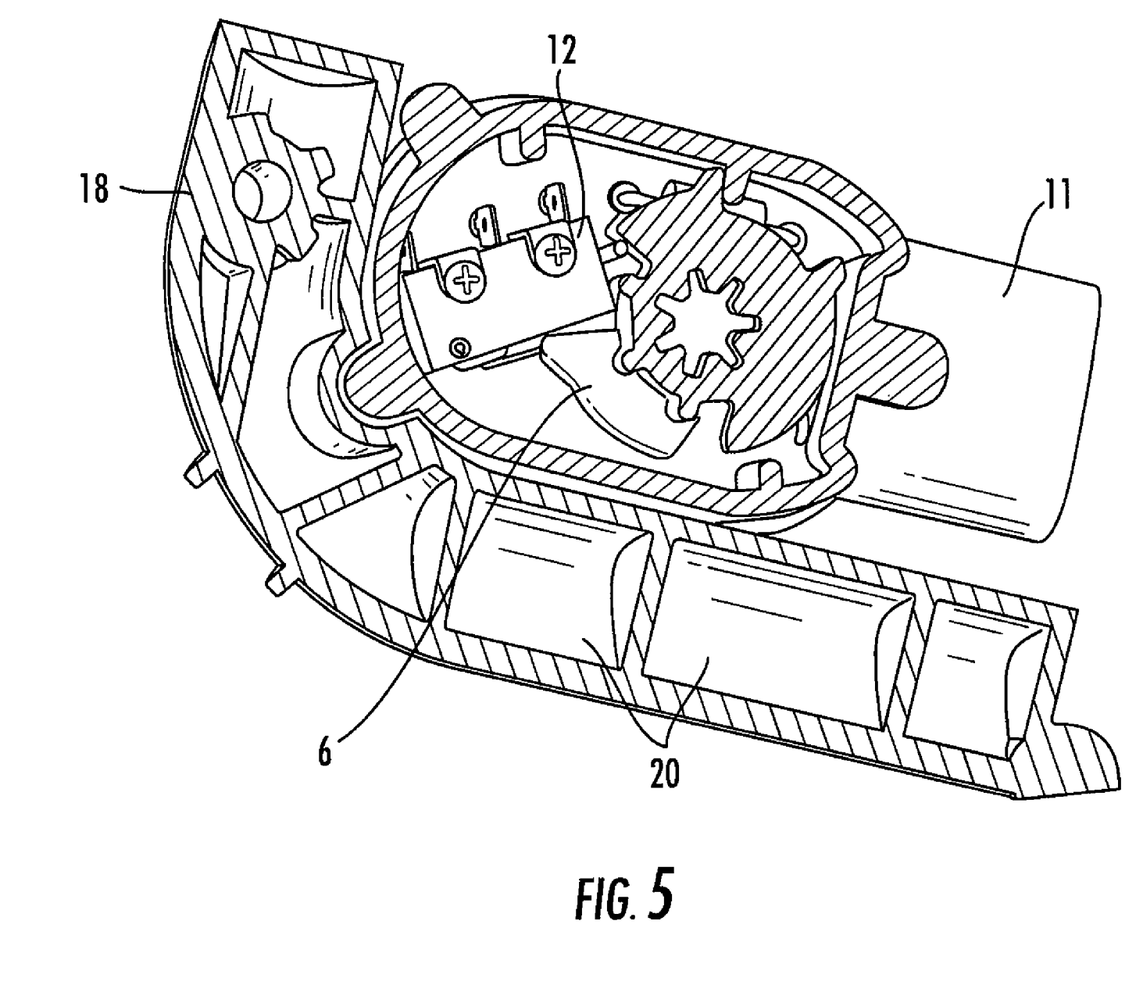
FIG. 5 is an isometric section view, through the rotor actuator, of an accelerator module attached to a mounting bracket.

Referring to FIGS. 4 and 5, the module 1 may be mounted to a mounting bracket 18 that may advantageously define numerous configurations to permit the mounting of the module 1 to different vehicle configurations. The mounting bracket 18 may define spaced apart portions or spaces 20 that with the configuration of the bracket provide isolation and cushioning of the accelerator module 1 from damage by rocks, logs and/or general flying debris.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An apparatus for providing a variable voltage output for a vehicle to control the acceleration or deceleration of the vehicle, comprising:

a rotor actuator comprising a first end and a second end, the first end configured to be operatively connected to an accelerator pedal of the vehicle, the second end defining a recess;

a magnet disposed in the recess;

a printed circuit board assembly defining an aperture sized to fit around the second end of the rotor actuator, the printed circuit board assembly comprising a Hall Effect chip configured to produce a variable voltage output in proportion to the relative locations of the magnet and the Hall Effect chip; and an on/off switch disposed on the printed circuit board assembly;

whereby when the accelerator pedal is moved, the rotor actuator rotates and contacts and activates the switch and moves the magnet in an arc-type path across the Hall Effect chip creating a change in the variable output voltage that in turn controls the acceleration or deceleration of the vehicle.

2. The apparatus according to claim 1, further comprising a housing and a cover for protecting the apparatus from outside contaminants.

3. The apparatus according to claim 2, wherein the housing and cover provide water-tight protection for the apparatus.

4. The apparatus according to claim 2, further comprising:
a torsion spring disposed on the first end of the rotor actuator;
a first washer positioned adjacent to the torsion spring;
an o-ring positioned adjacent to the first washer; and
a second washer positioned adjacent to the o-ring.

5. The apparatus according to claim 1, further comprising a spacer washer disposed on the second end of the rotor actuator and adjacent to the printed circuit board assembly.

6. The apparatus according to claim 2, further comprising a bracket configured to mount the apparatus to a vehicle.

7. The apparatus according to claim 6, the bracket defining at least one space to provide isolation and cushioning from flying debris.

8. The apparatus according to claim 1, wherein the first end of the rotor actuator defines a spline.

9. An accelerator module for providing a variable voltage output for controlling a vehicle, comprising:
a rotor actuator comprising a first end and a second end, the first end configured to be operatively connected to an accelerator pedal of the vehicle, the second end defining a recess;
a magnet disposed in the recess;
a printed circuit board assembly comprising a Hall Effect chip disposed adjacent to the second end of the rotor actuator, the Hall Effect chip configured to produce a variable voltage output in proportion to the relative locations of the magnet and the Hall Effect chip; and
an on/off switch disposed on the printed circuit board assembly;
whereby movement of the accelerator pedal causes the rotor actuator to rotate in a first direction to contact and activate the switch and to rotate the magnet across the Hall Effect chip in a first arc creating a change in the variable output voltage that in turn controls the acceleration or deceleration of the vehicle.

10. The accelerator module according to claim 9, whereby when the rotor actuator is allowed to rotate in a second direction opposite the first direction, the magnet passes across the Hall Effect chip in a second arc.

11. The accelerator module according to claim 9, wherein the printed circuit board assembly defines an opening, and wherein the opening is positioned around the second end of the rotor actuator.

12. The accelerator module according to claim 11, wherein rotation of the rotor actuator in the first direction triggers the switch to an on position.

13. The accelerator module according to claim 12, wherein rotation of the rotor actuator in a second direction opposite the first direction triggers the switch to an off position.

14. The accelerator module according to claim 11, further comprising edge connectors disposed on the printed circuit board assembly, the edge connectors configured to electrically connect the accelerator module to the vehicle.

15. An accelerator module for a vehicle comprising:
a housing;
a cover configured to fit onto the housing;
a rotor actuator pivotably disposed in the housing, the rotor actuator comprising a first end and a second end, the first end configured to be operatively connected to an accelerator pedal of the vehicle;
a printed circuit board assembly defining an aperture sized to fit around the second end of the rotor actuator,
an on/off switch disposed on the printed circuit board assembly, whereby when the rotor actuator rotates, the rotor actuator contacts and activates the switch;
a torsion spring disposed between the rotor actuator and the housing;
a first washer positioned adjacent to the torsion spring; and
an o-ring positioned adjacent to the first washer.

16. The accelerator module according to claim 15, wherein the first end of the rotor actuator further defines a spline configured to engage a link connecting the accelerator module to an accelerator pedal.

17. The accelerator module according to claim 15, further comprising a bracket for mounting the accelerator module to the vehicle, the bracket configured to provide isolation and cushioning from flying debris.

18. The accelerator module according to claim 15, wherein the printed circuit board assembly is disposed in the housing adjacent to the cover.

* * * * *